Dec. 20, 1938.  J. W. LEIGHTON  2,140,803
SPRING CONSTRUCTION
Filed Oct. 16, 1936
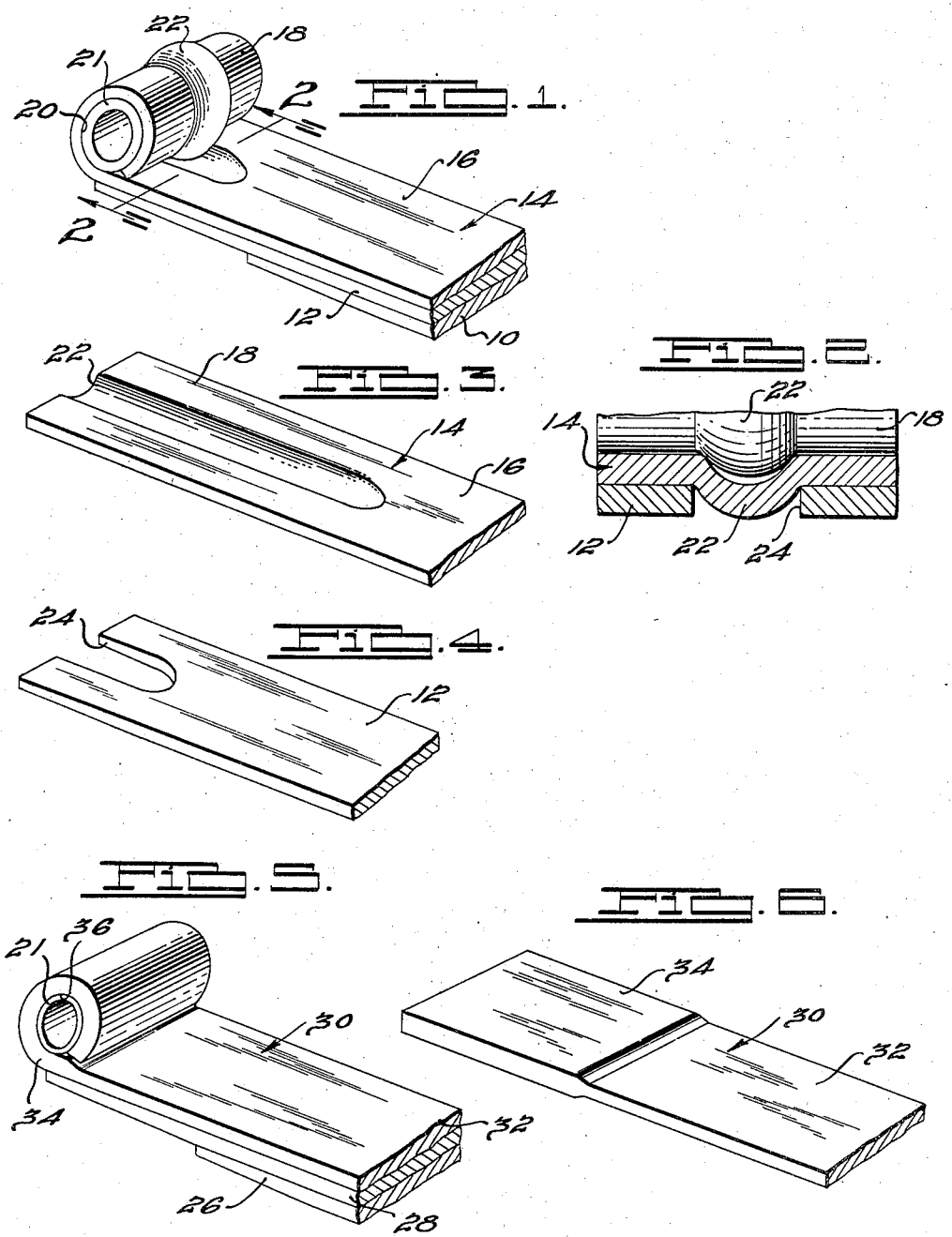
INVENTOR.
John W. Leighton.
BY
Harness, Dickey, Pierce & Hann
ATTORNEYS.

Patented Dec. 20, 1938

2,140,803

UNITED STATES PATENT OFFICE 2,140,803

SPRING CONSTRUCTION

John W. Leighton, Port Huron, Mich.

Application October 16, 1936, Serial No. 105,877

1 Claim. (Cl. 267—47)

This invention relates to an improved spring construction and in particular relates to an improved leaf spring construction for vehicles.

One of the objects of the present invention is to provide strong spring eye structures which will not become distorted when a bushing is inserted therein, and will not open up and loosen when subjected to strain in use.

Another object of the present invention is to provide strong spring constructions to meet modern vehicle riding requirements in which the spring leaves are relatively thin in the main spring portion in order to give the desired spring characteristics and are relatively stiffer in those portions of the spring which form the spring eyes, whereby the spring eyes are materially stronger.

A further object is to provide novel leaf spring constructions having the desired strength and spring characteristics and which are economical and simple to manufacture.

Other objects of the invention will become apparent from the following specification, the drawing relating thereto and from the claim hereinafter set forth.

In the drawing, in which like numerals are used to designate like parts in the several views throughout:

Figure 1 is a fragmentary perspective view of a leaf spring construction embodying features of the present invention;

Fig. 2 is a cross-sectional view taken substantially along the line 2—2 of Fig. 1;

Fig. 3 is a fragmentary perspective view of a spring leaf shown in Fig. 1 in an intermediate step of its manufacture;

Fig. 4 is a fragmentary perspective view of one of the spring leaves forming the embodiment shown in Fig. 1;

Fig. 5 is a fragmentary perspective view of a modified form of leaf spring construction embodying features of the present invention; and Fig. 6 is a fragmentary perspective view of a spring leaf illustrated in Fig. 5 in an intermediate step of its manufacture.

Referring to the drawing, in Fig. 1 one end of a leaf spring construction is illustrated comprising a plurality of superimposed spring leaves 10, 12 and 14, secured in place relative to each other in the usual way.

In the preferred embodiment of the invention illustrated in Fig. 1, the present invention is directed particularly to the construction of the spring leaves 14 and 12, the spring leaf 14 being the one providing the spring connection to the vehicle frame or shackle member. The leaf 14 comprises a main spring portion 16 of the desired width and relatively thin in thickness so that the desired soft spring characteristics are obtained. End portions 18 of the leaf 14 are bent or rolled upon themselves to form spring eyes 20 through which plain or threaded bushings 21 are pressed or screwed, the leaf spring then being attached to the vehicle in the usual manner.

When bushings of either the plain or threaded type are fitted within the spring eye considerable pressure is applied so that a tight fit between the bushings and the spring eye is assured. By making the spring eye relatively stronger and stiffer than the main spring portion of the leaf, the eyes are strong enough to hold the bushings that are pressed or screwed into them and will not expand and spring apart either when the bushings are first fitted into them or when the eyes are subjected to severe strain in use. Play between the springs and the bushings is thus avoided.

In order to provide a tight and strong connection and prevent play, the present invention contemplates, in the form shown in Fig. 1, deforming the end portions 18 by pressing or stamping and thereby providing a longitudinally extending offset portion 22 at substantially the transverse center of the end portion. When the end portions 18 are bent to form the spring eyes 20 the offset portion 22 provides an outwardly extending rib around the spring eye. This rib provides a spring eye construction which is relatively stiff and strong, which will not become sprung open when in use.

As the inner end of the offset portion 22 extends within the substantially straight portion of the leaf 14 and as it is desired that the faces of the leaves 12 and 14 may be flush with each other when the leaves are in assembled position, the leaf 12 is provided with cut out portions 24 at substantially its transverse center adjacent the ends. It is evident that when the leaves 12 and 14 are in their assembled position a portion of the offset portion 22 fits within the opening 24 so that the adjacent faces of the leaves 12 and 14 are flush with each other.

In the modified structure shown in Figs. 5 and 6 one end of a leaf spring construction is illustrated comprising a plurality of superimposed spring leaves 26, 28 and 30, secured in place relative to each other in the usual way.

The invention illustrated in this modification is directed particularly to the construction of the spring leaf 30 which is the leaf providing the spring connection to the vehicle frame or shackle member. The leaf 30 comprises a main spring portion 32 of the desired width and relatively thin in thickness so that the desired soft spring characteristics are obtained. End portions 34 of the leaf 30 are bent or rolled upon themselves to form spring eyes 36 through which plain or threaded bushings 21 are pressed or screwed.

In order to provide a tight and strong connection and prevent play, the present invention contemplates forming the spring leaf 30 of substantially uniform width throughout its length having relatively thick portions of the ends 34, and then forming the eye 36 from the thick portion so that those portions of the leaf forming the eye are of greater cross-sectional area than the main spring portion 16, and are, therefore, relatively stiffer and stronger. The portions 34 forming the eye 36 are materially stronger than the main spring portions 32 of the spring leaf, while the leaf with the relatively thin main spring portion 32 retains the soft spring characteristics which are desirable. The relatively thick end portions permit great stress to be applied to the spring eye without resulting in the objectionable springing out discussed above.

The spring leaf 30 with the relatively thin main spring portion 32 and the relatively thick end portions 34 may be made in one of several ways. A strip of suitable material such as spring steel having the desired width and the thickness of the main spring portion 32 may be selected, and the end portions 34 may be made considerably thicker by an upsetting operation. Another method of obtaining the structure of this modification is to select a suitable strip having a thickness throughout its length equal to the desired thickness of the relatively thick end portions, and then reduce the thickness of the strip by a rolling operation in that portion of the strip which forms the main spring portion of the spring leaf. The thickness of this main spring portion may be reduced by rolling to the relatively thin section desired to obtain the soft spring characteristics. The transversely extending spring eyes 36 are then formed by bending or rolling the thickened end portions 34 on themselves to the form indicated in Fig. 5.

It is evident from the above that this invention provides novel spring constructions and novel methods of making the spring constructions so as to obtain the soft spring characteristics necessary in modern vehicle riding requirements and simplified eye constructions which will not spring apart or become distorted in use.

Formal changes may be made in the embodiments of the invention described without departing from the spirit and substance of the broad invention, the scope of which is commensurate with the appended claim.

What I claim is:

A vehicle leaf spring comprising a plurality of superimposed leaves, one of the outermost leaves having longitudinally extending offset portions substantially at its transverse center adjacent the ends thereof and having the main body portion between the ends of substantially rectangular cross section, said portions being bent to form spring eyes having ribs therearound, and the next adjacent spring leaf having cut out portions adjacent the ends thereof substantially at its transverse center, one face of said last named spring leaf being flush with a face of said first named spring leaf, and portions of the offset portions of said first named spring leaf being received within said cut out portions.

JOHN W. LEIGHTON.